Figure 3:
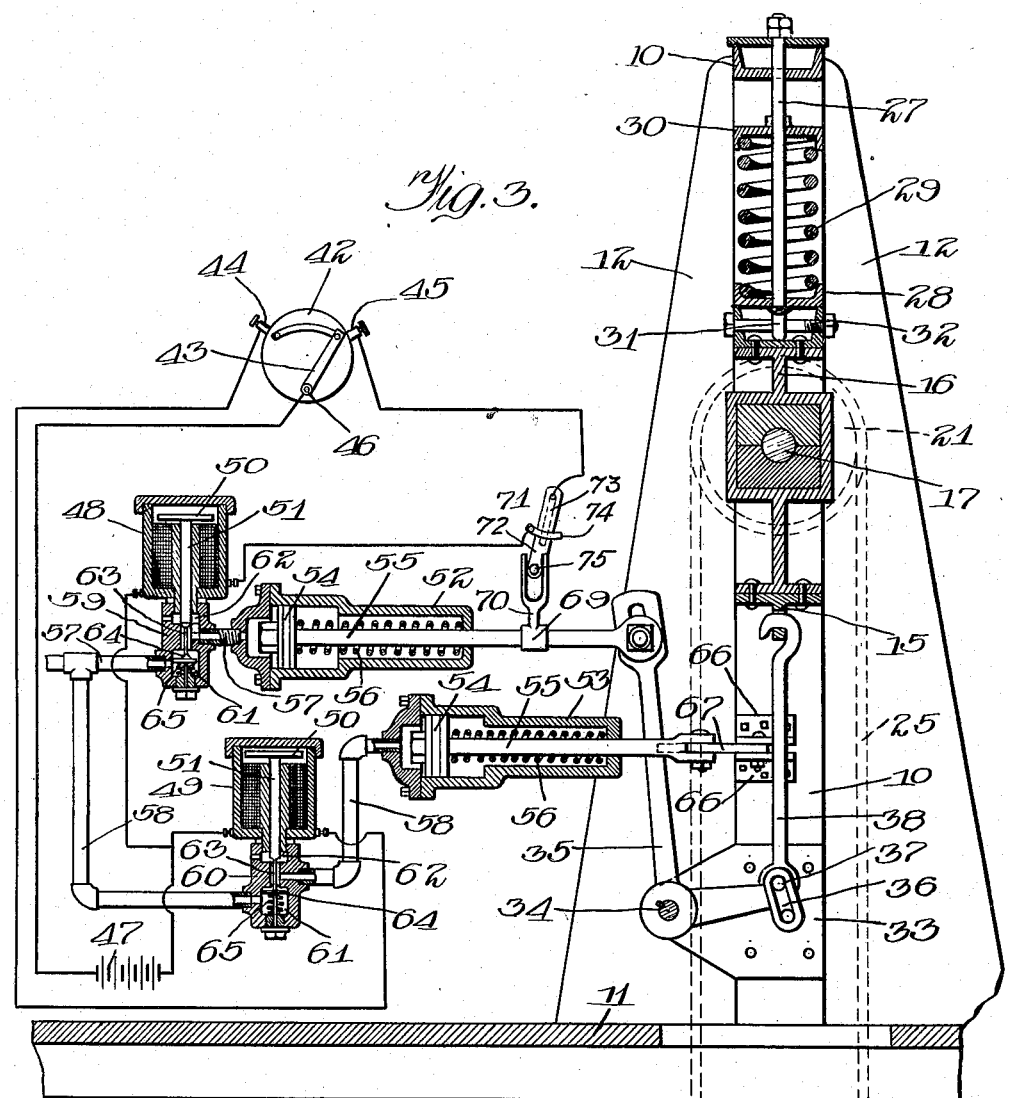

H. H. TAYLOR.
TEMPERATURE CONTROLLED TRANSMISSION MECHANISM.
APPLICATION FILED AUG. 2, 1907.
939,566.
Patented Nov. 9, 1909.
3 SHEETS—SHEET 1.
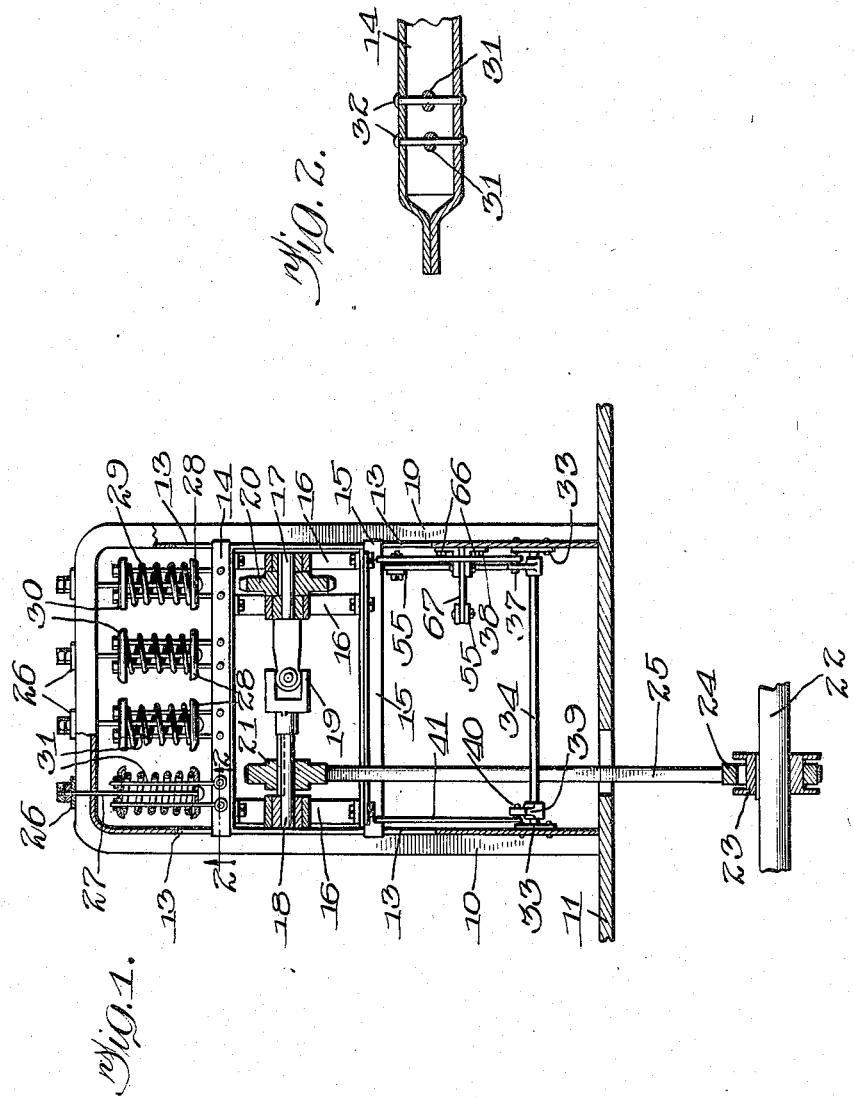

H. H. TAYLOR.
TEMPERATURE CONTROLLED TRANSMISSION MECHANISM.
APPLICATION FILED AUG. 2, 1907.

939,566.

Patented Nov. 9, 1909.

3 SHEETS—SHEET 2.

Witnesses:

Inventor
Horace H. Taylor.

H. H. TAYLOR.
TEMPERATURE CONTROLLED TRANSMISSION MECHANISM.
APPLICATION FILED AUG. 2, 1907.

939,566.

Patented Nov. 9, 1909.

3 SHEETS—SHEET 3.

Witnesses:
G. V. Demarus Jr.
William H. DeBusk

Inventor:
Horace H. Taylor,
by Boudet & ... Richard Jackson
his atty.

UNITED STATES PATENT OFFICE.

HORACE H. TAYLOR, OF SAN JOSE, CALIFORNIA, ASSIGNOR OF ONE-HALF TO HIMSELF, AND ONE-HALF TO FRANK J. MAYHEW, OF SAN FRANCISCO, CALIFORNIA.

TEMPERATURE-CONTROLLED TRANSMISSION MECHANISM.

939,566.  Specification of Letters Patent.  Patented Nov. 9, 1909.

Application filed August 2, 1907. Serial No. 386,792.

*To all whom it may concern:*

Be it known that I, HORACE H. TAYLOR, a citizen of the United States, residing at San Jose, county of Santa Clara, State of California, have invented certain new and useful Improvements in Temperature-Controlled Transmission Mechanism, of which the following is a specification, reference being had to the accompanying drawings.

This invention relates to temperature-controlled transmission mechanism, and is particularly designed for use in connection with a car cooling system which is run by power taken from the car-axle. In the transportation of perishable articles, such as meats, or fruits, it is highly desirable that the car be loaded and sealed at the outset and be not disturbed until it reaches its destination. This necessitates of course controlling means by which the cooling mechanism, in cases where artificial cooling is employed, may be automatically thrown into or out of operative engagement with the car-axle according as the temperature in the car reaches a certain high or low point, respectively.

The object of my invention is to provide a new and improved system of this character which shall insure that the temperature shall not rise above a predetermined maximum nor fall below a predetermined minimum. I accomplish this object by the means shown in the drawings and hereinafter specifically described. That which I believe to be new will be set forth in the claims.

Figure 4:
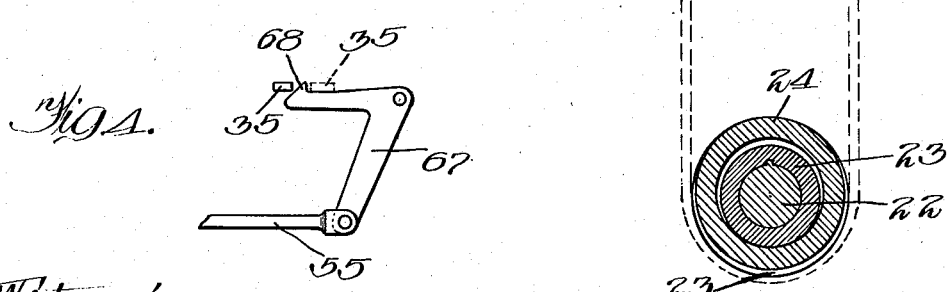
Figure 5:
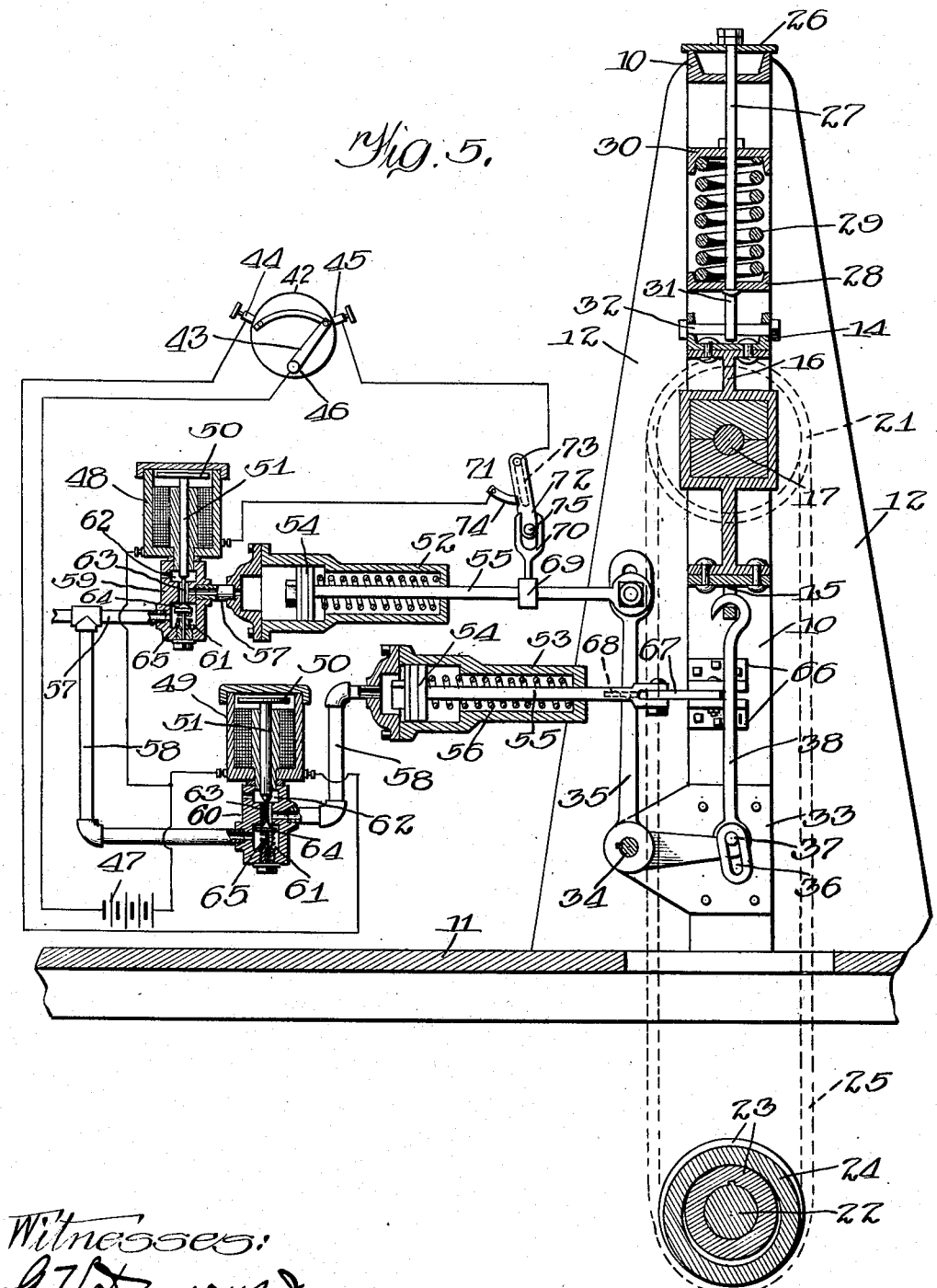

In the drawings:—Figure 1 is a view, partly in section, of those parts of the machine by which power is transmitted from a car-axle or other rotating shaft. Fig. 2 is a view taken at line 2 2 of Fig. 1. Fig. 3 is a side view of my improved mechanism, partly in section, the supports for the cylinders and electro-magnets being omitted for clearness of illustration. Fig. 4 is a top or plan view of the bell-crank lever which holds the driven shaft out of operative engagement with the driving shaft. Fig. 5 is a view similar to Fig. 3, but showing the different parts in a different relative position.

Referring to the several figures of the drawings, in which corresponding parts are indicated by like reference characters, 10 indicates an inverted U-shaped channel-iron frame suitably secured to a floor 11 and reinforced by two plates 12 at each side. The web of the channel-iron frame at each side is provided with slots 13 in which slots slides a frame composed of channel-iron 14, T-iron 15 and standards 16. The flanges of the channel-iron 14 are brought together at each end to form guides which shall travel in the slots 13.

The standards 16 are rigidly secured between the parts 14 and 15, and each standard 16 is provided with a journal-box and bearing-block. In these are journaled two shafts 17 and 18 connected by a universal coupling 19. Upon the shaft 17 is keyed a gear 20, and upon the shaft 18, in the construction shown, is feathered a pulley 21.

22 indicates another shaft having keyed upon it a collar 23. Around this collar 23 is a drum 24 whose inside diameter is somewhat greater than the outside diameter of the collar proper. The collar 23 and drum 24 are in alinement with the pulley 21, and around the pulley 21 and drum 24 passes a belt 25, the outer surface of the collar and the inner surface of the drum being such as to provide the proper frictional engagement between them when the belt 25 is tightened to cause the shafts 22 and 18 to rotate together.

Depending from plates 26 resting upon the flanges of the channel-iron of the frame 10 are four bolts 27 which support at their lower ends caps 28 upon which rest coiled springs 29. Upon these springs rest caps 30, from which depend rods 31 having eyes at their lower ends through which pass pins 32 which also pass through suitable openings in the flanges of the channel-iron 14.

It will be seen that the shaft 18 and pulley 21 are thus yieldingly supported above the shaft 22, and it will be understood that the tension of the springs 29 may be regulated by means of the nuts on the ends of the bolts 27 so that the collar 23 and drum 24 will bear upon each other with sufficient force to cause shaft 22 and shaft 18 to rotate together. It will also be understood that if the slidable frame be pulled down sufficiently against the action of the springs 29, the belt 25 will be slacked and the parts 23 and 24 will cease to have operative engagement so that the shaft 22 can no longer drive shaft 18 until the springs 29 be again allowed to draw the slidable frame upward thus tightening again the belt 25.

The gear 20, which of course is rotated with the pulley 21, is adapted to have connected with it any approved form of power-operated cooling device. Inasmuch as this cooling device forms no part of my present invention and may be of any well-known form and construction, I have not illustrated it, it being understood that when the belt 25 is tightened by means of the springs 29 such cooling device will be operated to reduce the temperature and that while the belt 25 is held slack the cooling device will remain idle. It is the object of my invention to provide means for automatically starting and stopping the operation of such power-operated cooling device whenever the temperature rises above or falls below, respectively, certain predetermined limits, quite irrespective of the form of such power-operated cooling device.

33 indicates two plates suitably secured to the frame 10, in the projecting ends of which is journaled a rock-shaft 34. Upon one end of this shaft 34 is keyed a bell-crank lever 35, the end of the horizontal arm of which is provided with a vertical slot 36 adapted to engage a stud 37 on the lower end of a link 38 the upper end of which is hooked into a suitable opening in the T-iron 15. The opposite end of the shaft 34 is provided with a similar horizontal arm 39 the slotted end of which engages a stud 40 on the lower end of a link 41 the upper end of which is hooked into another suitable opening in the T-iron 15.

Referring to Figs. 3 and 5, 42 indicates a thermostat having a pointer 43 adapted to complete an electrical circuit between the contact 44 or the contact 45 and the contact 46 according as a predetermined maximum or minimum temperature is reached, respectively. It will be noted that the circuit leads from the point 46 through a battery 47, after which it divides, one line going through an electro-magnet 48 and the other through an electro-magnet 49. From the magnet 48, the circuit leads to a circuit-breaking device hereinafter described whence it returns to the thermostat, while the other circuit leads directly, in the construction shown, from the magnet 49 to the thermostat.

Each of the magnets is provided with an armature 50 secured upon one end of the rod 51 which constitutes the core of the magnet and which is adapted to slide up and down in the solenoid as will be readily understood and as hereinafter described.

52 53 indicate two cylinders, each provided with a piston 54, piston-rod 55, and coiled spring 56 tending to hold the piston in the position shown in Fig. 3. The pistons illustrated are adapted to be operated by means of compressed air, and are shown connected up by pipes 57 58 respectively which are in turn connected with any suitable source of compressed air (not shown).

59 60 indicate the body portions of two valves interposed in the pipes 57 58 respectively, each provided with two chambers 61 62 and an inter-communicating passage 63. As shown, the chamber 61 and passage 63 communicate with the two portions of the pipe, while the chamber 62 has an outlet into the open air.

The parts 59 60 are secured in any suitable manner to the magnets 48 49, respectively, so that the rods 51 enter the passages 63. As shown, each rod 51 is diminished in size for a distance at its lower end where it enters the passage 63, forming a shoulder which is adapted to seat upon the upper end of the passage 63 whenever its magnet 48 or 49 is energized. On the lower end of each rod 51 is secured a valve 64 adapted to be held up against the lower end of the passage 63 by a coiled spring 65 except when displaced therefrom against the action of the spring by means of the magnet.

The forward end of the piston rod 55 of the cylinder 52 is suitably pivoted to the upper end of the vertical arm of the bell-crank lever 35.

66 indicates two brackets suitably secured, in the construction shown, to one side of the frame 10. Pivoted between them is a bell-crank lever 67, one arm of which is pivotally secured to the forward end of the piston rod 55 of the cylinder 53. The end of the other arm of the lever 67 is provided with a shoulder 68 which is square on its forward edge and tapered on the other, the lever 67 thus constituting a latch held in operative position by the spring 56 of the cylinder 53. Referring to Figs. 3, 4 and 5, it will be seen that the lever 67 is so placed with reference to the lever 35 that when the parts are in the position shown in Fig. 3, the vertical arm of the lever 35 is in rear of the shoulder 68, but when this vertical arm is forced forward by any means the lever 67 is given sufficient turn on its pivot against the action of the spring 56 of the cylinder 53 by reason of the tapered rear edge of the part 68 as to permit the vertical arm to pass the shoulder 68, the parts assuming the position illustrated in Fig. 5 and as shown in dotted lines in Fig. 4.

On the piston rod 55 of the cylinder 52 is a sleeve 69 rising from which is a fork 70. 71 indicates a switch by means of which the circuit through the magnet 48 may be broken. 72 indicates the movable lever of the switch shown, and 73 74 indicate the conductor members. 75 is an arm extending at right angles from the end of the lever 72 between the arms of the fork 70, the arms 75 being of such size as to permit a certain amount of play, as hereinafter described.

The operation of the device shown is as follows:—With the temperature about the device at some point between the predetermined minimum and maximum temperatures desired, and with the cooling mechanism in operation as shown in Fig. 3,— where the lever 35 is shown free of the lever 67 and where the springs 29 are shown as holding the friction drum 24 in contact with the friction collar 23,—the temperature is being gradually reduced and the pointer 43 is gradually approaching the contact 45. When the predetermined temperature desired is attained, the pointer 43 will have reached the point 45 and will have completed the circuit through the battery and the magnet 48, drawing down its armature 50, closing the upper end of the passage 63 into the chamber 62, and opening the lower end of said passage into the chamber 61 against the force of the compressed air. The air then rushes into the cylinder 52, and forces the piston 54 to the limit of its motion. Fig. 3 shows the device with the cylinder 52 in communication with the source of compressed air and just immediately before the movement of the piston has taken place. This movement of the piston turns the switch lever 72 on its pivot, until the parts 73 and 74 are out of contact, whereupon, the circuit through the magnet being broken, the armature 50 rises by the action of the spring 65, closing the lower end of the passage 63 and again opening the upper. Meantime, the vertical arm of the lever 35 has been forced a short distance beyond the shoulder 68. The pressure in the cylinder 52 being relieved by the opening of the passage into the chamber 62, the piston is retracted by the force of the spring 56 and the springs 29 until the lever 35 is brought up against the shoulder 68. On account of the play between the arms of the fork 70 and the arm 75, the short backward movement of the fork 70 is not sufficient to close again the circuit through the magnet 48. The parts have now assumed the position shown in Fig. 5, where the lever 35 is shown as held by the lever 67, holding the slidable frame which carries the gear 21 down so that the belt 25 is loose and so that there is no operative engagement between the friction collar 23 and the friction drum 24. It is evident that the cooling machine then immediately ceases to operate.

With the parts as shown in Fig. 5, with the cooling machine not in operation, the temperature gradually increases until the predetermined maximum temperature desired is reached, at which time the pointer 43 will have reached the contact point 44, completing the circuit through the battery and the magnet 49, drawing down the armature 50 of that magnet. This establishes communication between the source of compressed air and the cylinder 53 in the manner above described in connection with cylinder 52. The piston 54 of this cylinder is then forced to the limit of its motion, turning the lever 67 on its pivot and releasing the lever 35. The force of the springs 56 and 29 immediately moves the piston 54 of the cylinder 52 back to the position shown in Fig. 3, reëstablishing operative engagement between the collar 23 and drum 24, and causing the cooling mechanism to resume operation.

While I have described my mechanism as being operated by compressed air, it is evident, of course, that any suitable fluid pressure may be used. It is also evident that many changes might be made in the details of the structure shown without departing from my invention as set forth in the claims, and I do not wish to restrict myself to the specific structure shown.

What I claim as my invention and desire to secure by Letters Patent is:—

1. In a temperature-controlled transmission mechanism, the combination of a driven shaft, a second shaft yieldingly supported adjacent thereto, an endless belt connecting said two shafts, and temperature-controlled means for moving said yieldingly-supported shaft toward said first-mentioned shaft whereby said endless belt is slacked.

2. In a temperature-controlled transmission mechanism, the combination of a driven shaft, a second shaft yieldingly-supported adjacent thereto, an endless belt connecting said two shafts, a bell-crank lever, connections between one arm of said lever and said second shaft, and temperature-controlled means connected with the other arm of said lever whereby it is adapted to turn said lever and move said second shaft toward said first-mentioned shaft so that said endless belt is slacked.

3. In a temperature-controlled transmission mechanism, the combination of a driven shaft, a second shaft yieldingly-supported adjacent thereto, an endless belt connecting said two shafts, temperature-controlled means for moving said yieldingly-supported shaft toward said first-mentioned shaft whereby said endless belt is slacked, and a latch adapted to automatically catch and hold said shaft when moved to its position nearer said first-mentioned shaft.

4. In a temperature-controlled transmission mechanism, the combination of a driven shaft, a second shaft yieldingly-supported adjacent thereto, an endless belt connecting said two shafts, temperature-controlled means for moving said yieldingly-supported shaft toward said first-mentioned shaft whereby said endless belt is slacked, a latch adapted to automatically catch and hold said shaft when moved to its position nearer said first-mentioned shaft, and temperature-controlled means for disengaging said latch.

5. In a temperature-controlled transmission mechanism, the combination of a driven shaft, a second shaft yieldingly-supported adjacent thereto, an endless belt connecting said two shafts, a bell-crank lever, connections between one arm of said lever and said second shaft, temperature-controlled means connected with the other arm of said lever whereby it is adapted to turn said lever and move said second shaft toward said first-mentioned shaft so that said endless belt is slacked, a latch adapted to automatically catch and hold said lever in its turned position, and temperature-controlled means for disengaging said latch.

6. In a temperature-controlled transmission mechanism, the combination of a driven shaft, a second shaft yieldingly-supported adjacent thereto, an endless belt connecting said two shafts, a rock-shaft, a bell-crank lever non-rotatably mounted on said rock-shaft, connections between one arm of said lever and said second shaft, an arm non-rotatably mounted on said rock-shaft, connections between said arm and said second shaft, and temperature - controlled means connected with the other arm of said lever whereby it is adapted to turn said lever and move said second shaft toward said first-mentioned shaft so that said endless belt is slacked.

7. In a temperature-controlled transmission mechanism, the combination of a driven shaft, a second shaft yieldingly-supported adjacent thereto, an endless belt connecting said two shafts, a bell-crank lever, connections between one arm of said lever and said second shaft, temperature-controlled means connected with the other arm of said lever whereby it is adapted to turn said lever and move said second shaft toward said first-mentioned shaft so that said endless belt is slacked, a spring-actuated bell-crank lever one arm of which is adapted to catch and hold said first lever in its turned position, and temperature-controlled means connected with the other arm of said spring-actuated lever and adapted to disengage said spring-actuated lever from said first lever.

HORACE H. TAYLOR.

Witnesses:
HARRIOT F. GRISWOLD,
E. L. ROBERTSON.